Figure 1:
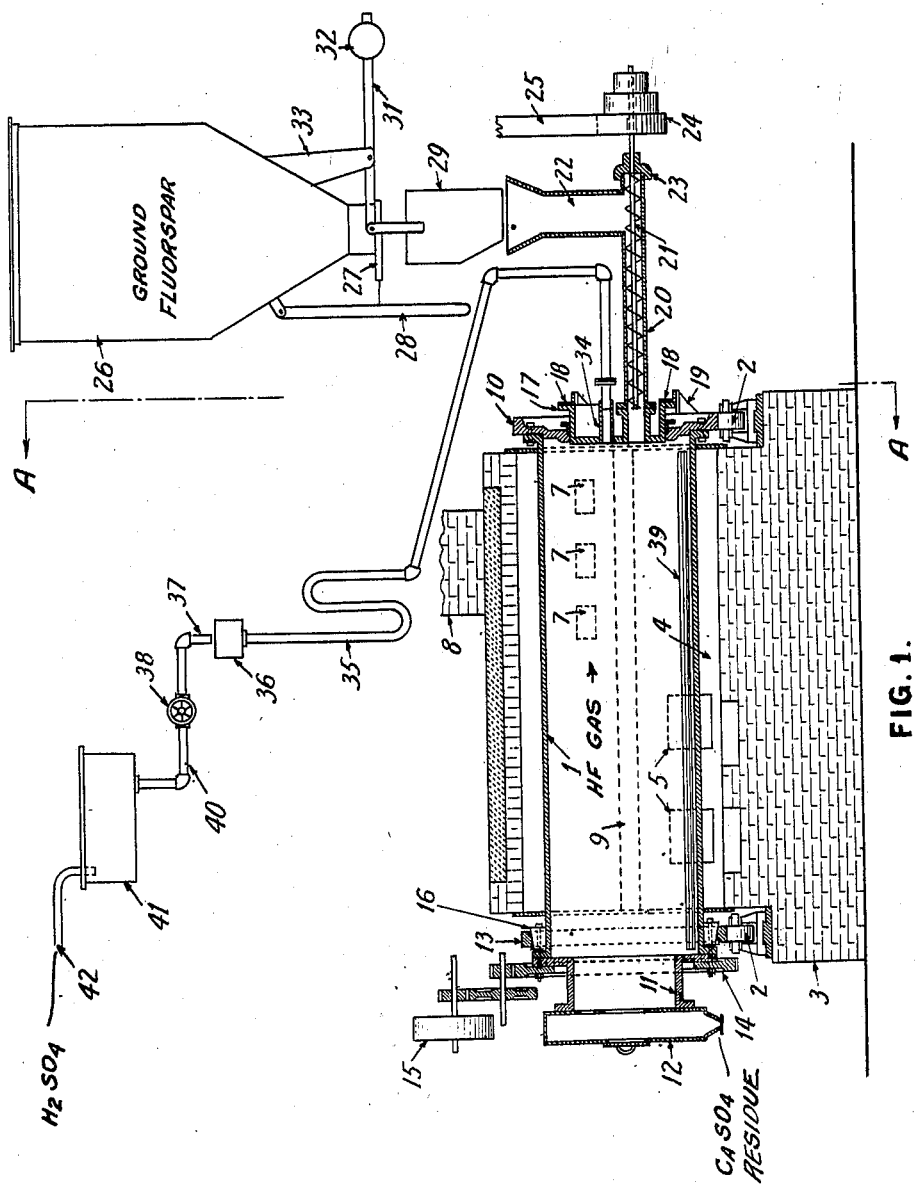

Patented Feb. 25, 1930

1,748,735

UNITED STATES PATENT OFFICE

GARNETT L. SCOTT, OF BALTIMORE, MARYLAND, ASSIGNOR TO GENERAL CHEMICAL COMPANY, OF NEW YORK, N. Y., A CORPORATION OF NEW YORK

CONTINUOUS PRODUCTION OF HYDROFLUORIC ACID

Application filed June 30, 1926. Serial No. 119,538.

This invention relates to a process and apparatus for the continuous production of hydrofluoric acid from a fluoride and an acid, and has for its principal object the improvement of such process and apparatus whereby increased yields and economies in operation are obtained.

The invention further contemplates the provision of an improved process and apparatus to avoid the escape and loss of the hydrofluoric acid gas produced as a product of the operation.

The invention more specifically has for an object the provision of improvements in the raw material feeding operation, whereby not only is such operation simplified, but the efficiency of the entire process greatly increased.

In the continuous production of hydrofluoric acid as generally practiced, it is customary to mix together a charge consisting of a fluoride, as calcium fluoride, and an acid, as sulfuric acid, and feed this material into a tubular retort, to which heat is applied to complete the reaction between the fluoride and acid to produce hydrofluoric acid gas. The charge is gradually moved through the retort at a rate equal to its introduction, to render the process continuous. The general practice is to feed the mixed material in batches as prepared, at regular intervals. It has also been proposed to thoroughly mix the raw materials and feed them continuously into the retort, but this has not proven successful in practice due to the fact that the mixture tends to solidify rapidly and set up as a thick paste which cannot readily be made to flow.

As a result of these practices the evolution of the gas is to a considerable extent intermittent, varying from time to time as the raw materials are charged. The increased volume of gas produced upon adding a fresh charge to the retort tends to produce an increased pressure within the vessel, resulting in leakages of hydrofluoric acid gas, which of course not only reduces the yield of acid, but is highly objectionable and deleterious to the health of the operators. The absorption system through which the evolved hydrofluoric acid gas is passed must be of sufficient capacity to handle the maximum volume of gas produced during any period of the operation. This of course means that the absorption system is not working at maximum efficiency at all times. The draft through the apparatus must be maintained at a greater value than is necessary for the average volume of gas produced. This frequently results in incomplete absorption during the periods of low gas production, due considerably to increased leakage of air into the system during these periods. The most substantial disadvantage of the batch system of operation lies in the fact that the quantity of material charged is limited to that amount which the furnace can handle at a given instant. The average amount of material charged per unit of time over an extended period of operation will of course be much smaller than this maximum amount. It is to overcome the above mentioned difficulties that my invention is particularly designed.

Figure 2:
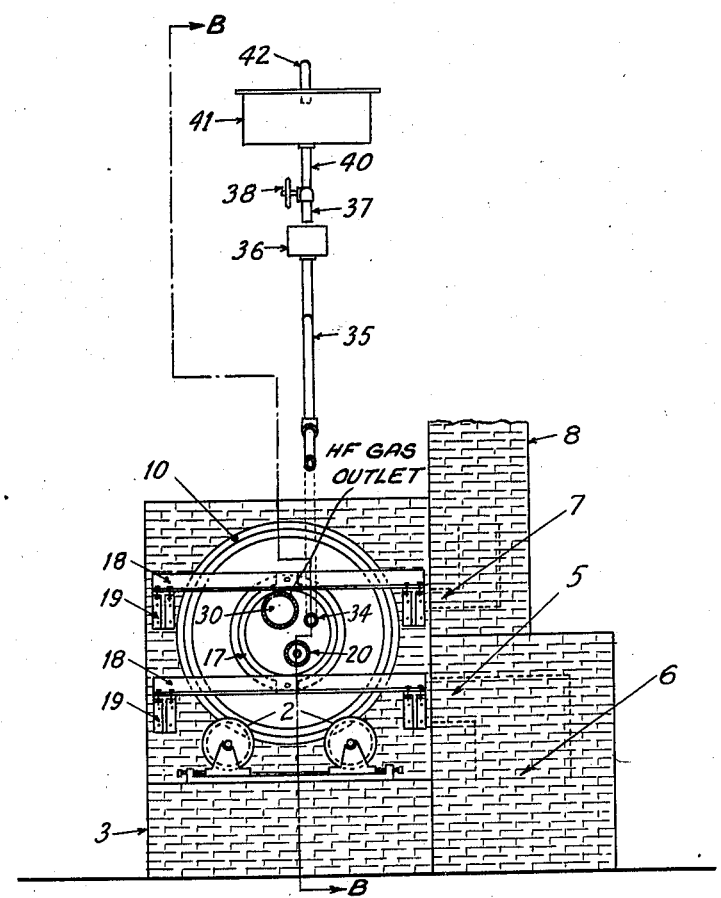

I have discovered that if the raw materials are introduced separately, or without a substantial mixing operation, directly into the retort, and at a continuous, uniform rate, these disadvantages are practically eliminated and in addition the capacity obtained from a given furnace is increased from 50-200%. As a preferred means for carrying out the operation in this improved manner I have devised the structure illustrated in the accompanying drawings in which:

Fig. 1 is a longitudinal, vertical section of the furnace upon the line B—B of Fig. 2, and Fig. 2 is a front elevation view upon the line A—A of Fig. 1.

The decomposition vessel may consist in general of a tubular retort, of the type, for instance, as disclosed in the patent of Bishop, 1,150,415. For purposes of illustration, I have shown a cylinder 1 consisting of a flanged, cast iron pipe, said cylinder being rotatively mounted on rollers 2 adjustably mounted on a brick work foundation 3. The brick work is extended around the cylinder, being separated therefrom by the space 4. This space is connected by flues 5 near the discharge end of the cylinder with a fire-box 6, as shown in Fig. 2. Hot gases from the fire-box are thus conducted through the flues 5 to the space 4 for the purpose of heating the cylinder 1, the gases in the process of combustion passing around such cylinder and out through the outlet flues 7 into the chimney 8. A baffle wall 9 is provided extending longitudinally of the cylinder between the inlet flues 5 and the outlet flues 7 and across the space 4 into close proximity with the cylinder so as to cause the gases entering through the flues 5 to pass around the cylinder before entering the outlet flues 7. It is highly desirable to maintain the temperature of the cylinder as nearly constant as possible in order that uniform operating conditions may be obtained. It will be seen that as the heat from the combustion chamber is first brought into contact with the cylinder near the discharge end thereof, that end is maintained at a higher temperature than the inlet end. This provides for the complete decomposition of the fluoride by the acid prior to discharge of the reacting materials.

An annular ring 10 is bolted to the inlet end of the cylinder and forms a track for cooperation with the rollers 2. To the discharge end of the cylinder is bolted an extension 11 to the outer end of which is secured a discharge device 12. Surrounding the cylinder at this end adjacent the flange thereof is provided an annular ring 13 resting upon the wedges 16 and adapted to form a track cooperating with the rollers 2 at this end of the cylinder. The bolts for securing the extension 11 to the cylinder pass through the wedges 16, and also through the peripherally toothed gear wheel 14. By taking up on the bolts the ring 13 is firmly held in position. The gear 14 is actuated in any suitable way as for instance by a train of gears operated from the power pulley 15.

In the central aperture of the plate 10 is provided a circular cast iron plate 17 supported rigidly in position by the beams 18 extending across the front end of the furnace. The beams 18 are supported in any suitable manner as by the brackets 19 secured to the brick work forming the enclosing chamber. The plate 17 is provided with suitable inlets 20 and 34 and outlet 30 (Figure 2) therein for the entering raw materials and the outgoing gaseous products of the operation. A conduit 20 through which extends a screw conveyor 21 is provided for continuously introducing the ground fluorspar. The stand pipe 22 extending upwardly from the conduit 20 is provided with a funnel-shaped opening into which the material is dumped. The shaft of the screw conveyor extends through a housing 23, acting as a bearing therefor, and is provided upon its outer end with a suitable step pulley 24 or other suitable variable speed device, enabling the feed to be adjusted to a predetermined rate. The pulleys may be driven by the belt 25.

Ground spar is placed in the storage hopper 26 from which it is discharged through gate 27 operated by hand lever 28 in controlled amounts into the weighing hopper 29. The hopper 29 is suspended from one end of the beam 31 upon the other end of which is slidably mounted the weight 32 by means of which the amount of spar run into the hopper 29 may be weighed and the total amount of charge fed into the furnace over a given period may be closely controlled. The lever 31 is suitably supported by a bracket 33 attached to the wall of the hopper 26. As will be clearly understood when a pre-determined amount of fluorspar has been run into the hopper 29 the gate 27 is closed and the contents of the hopper dumped into the standpipe 22 by the operator.

An acid inlet pipe 34 is likewise provided in the plate 17, connected through reverse bend pipe 35 to funnel 36. The reverse bend pipe forms a seal preventing escape of gases from the decomposition chamber. A continuous uniform stream of acid discharges in the funnel 36 through an orifice in the nozzle 37. A suitable regulating valve 38 is placed in the line 40 connected to an acid tank 41. The head of acid in the tank 41 is maintained substantially constant by any suitable means, as for instance, a line 42 connected to a suitable supply of acid.

The operation of my device is as follows:
The cylinder 1 is caused to rotate by means of the driving mechanism 15. The screw conveyor 21 is placed in operation and regulated to charge fluorspar into the cylinder at a uniform pre-determined rate. The acid supply is adjusted to continuously introduce an amount of acid sufficient to react with the fluorspar. The proportions of fluorspar and sulfuric acid may be varied but an experienced operator will be able to so proportion the relative amounts as to obtain a maximum yield of hydrofluoric acid for a given amount of materials charged. The furnace temperature is likewise controlled and maintained as nearly constant as possible. The operation is preferably so conducted that the reacting materials form a bed within the cylinder 1 which protects the incoming material from immediate direct contact with the heated surface of the cylinder. This I have found to be of particular value as the life of the furnace is considerably lengthened by not permitting the freshly charged spar to come into direct contact with the body of the furnace. The charge is thoroughly agitated and gradually moves from the inlet end of the cylinder toward the outlet end thereof, from which it is discharged through the device 12. The reaction which takes place consists of the interaction of the sulfuric acid with the fluorspar to form hydrofluoric acid and calcium sulphate. The gradually increasing temperature of the cylinder toward the outlet end causes the reaction between the reacting materials to be completed and the sulphate discharged to consist of small, loose, granular particles forming a residue easy to handle. The evolved hydrofluoric acid gas passes out of the cylinder through the outlet 30 (Figure 2) to a suitable absorbing system.

To insure a thorough agitation and breaking up of the materials, and to prevent the formation of a cake, particularly at the inlet end of the cylinder directly under the feeding means, I find it preferable to employ a number of sections of railroad rails 39 of a length approxmately equal to the interior longitudinal dimension of the cylinder 1. Upon rotation of the cylinder 1 the rails tend to ride up the side of the cylinder and then fall back with considerable force. These rails should preferably weigh about 25 pounds per foot to give satisfactory operation, as I have found that a lighter rail will not insure complete breaking up of the cake which tends to form at the inlet end of the cylinder. It is of course clear that the particular cross section of the rail or other agitation means is not of particular importance except that a beam having a relatively heavy compact cross section should be used.

It will be seen that as in my preferred construction the reacting materials are introduced directly into the decomposition chamber, there is no opportunity for the mixed materials to set up and cause stoppage of the feeding operation, as frequently occurred in the past. It moreover becomes possible to feed the charge at a continuous uniform rate, thereby permitting the furnace to be worked at its maximum capacity at all times and yet producing a constant evolution of gas characterized by a complete lack of fluctuations in volume attendant upon the prior methods of operating. The evolution of gas being practically constant permits maximum utilization of the absorption system over the entire operating period, as the maximum volume of gas capable of being handled by this system may be fed thereto at all times. It becomes possible to maintain a constant draft just sufficient to draw the gas through the system at the rate desired. Leakage of hydrofluoric acid gas from the system and of air into the system is eliminated concurrently with the elimination of fluctuations in the volume of gas produced. The relative proportions of acid and spar entering the furnace at any moment may be much more closely regulated than was possible under the batch system of operation. Moreover, the average amount of raw materials per unit of time fed into the furnace may be greatly increased, as compared with the batch system involving peak loads and intermediate depressions.

In addition to the increased yields made possible by my preferred feeding means, it becomes possible to considerably lessen the labor cost of operating a furnace of this type, as I have found that where a man was required to give his complete time to the operation of a furnace using batch charges, it now becomes possible for him to operate two or more furnaces with no additional effort.

It will be seen that the materials are introduced directly into a heated section of the decomposition vessel when operating in accordance with my preferred process, and that the first substantial mixing operation accordingly takes place in a heated zone. This I consider to be highly advisable as the possibility of the reacting material forming a hard cake is considerably lessened. It moreover appears that under these conditions the reaction is caused to commence more rapidly and to continue more uniformly, resulting in larger capacity of the furnace, and less loss of hydrofluoric acid gas.

I claim:

1. In the process of manufacturing hydrofluoric acid from a fluoride and an acid by subjecting said materials to the action of heat in a decomposition chamber, the step which comprises separately introducing said materials continuously and at a uniform rate into said chamber.

2. The process of manufacturing hydrofluoric acid from a fluoride and an acid, which comprises the steps of separately introducing said materials continuously and at a uniform rate into said chamber, and subjecting the materials thus introduced to continuous agitation sufficient to prevent the formation of a hard cake in the vicinity of the points of introduction of said materials.

3. The process of manufacturing hydrofluoric acid from a fluoride and an acid, which comprises the steps of separately introducing said materials continuously and at a uniform rate directly into a heated zone, and subjecting the materials thus introduced to continuous agitation within said heated zone, sufficient to prevent the formation of a hard cake in the vicinity of the point of introduction of said materials.

4. In the process of manufacturing hydrofluoric acid from a fluoride and an acid, by subjecting said materials to the action of heat in a decomposition chamber, the step which comprises introducing said materials, prior to a substantial mixing operation, continuously and at a uniform rate into said chamber.

5. The process of manufacturing hydrofluoric acid from a fluoride and an acid, which comprises the steps of introducing said materials, prior to a substantial mixing operation, continuously and at a uniform rate into a chamber, and subjecting the materials thus introduced to continuous agitation sufficient to prevent the formation of a hard cake in the vicinity of the point of introduction of said materials.

6. The process of manufacturing hydrofluoric acid from a fluoride and an acid, which comprises the steps of introducing said materials, prior to a substantial mixing operation, continuously and at a uniform rate, directly into a heated zone and subjecting the materials thus introduced to continuous agitation within said heated zone sufficient to prevent the formation of a hard cake in the vicinity of the point of introduction of said materials.

7. The process of manufacturing hydrofluoric acid from a fluoride and an acid, which comprises the steps of separately introducing said materials continuously and at a uniform rate into a decomposition chamber, maintaining a bed of material within said chamber, whereby immediate direct contact of the entering materials with the surface of said chamber is prevented, and subjecting the materials thus introduced to continuous agitation sufficient to prevent the formation of a hard cake in the vicinity of the point of introduction thereof.

8. The process of manufacturing hydrofluoric acid from a fluoride and an acid, which comprises the steps of separately introducing said materials continuously and at a uniform rate directly into a heated zone of a decomposition chamber, maintaining a bed of material within said zone, whereby immediate direct contact of the entering materials with the heated surface of said chamber is prevented, and subjecting the materials thus introduced to continuous agitation sufficient to prevent the formation of a hard cake in the vicinity of the point of introduction thereof.

9. An apparatus for the manufacture of hydrofluoric acid from a fluoride and an acid comprising a decomposition chamber, means for introducing a fluoride into said chamber, means for simultaneously and separately introducing an acid into said chamber, and means for subjecting said materials within said chamber in the vicinity of the point of introduction to continuous agitation sufficient to prevent the formation of a hard cake.

10. An apparatus for the manufacture of hydrofluoric acid from a fluoride and an acid comprising a decomposition chamber, feeding means for simultaneously introducing a fluoride and an acid into said chamber prior to a substantial mixing operation, and agitating means within said chamber adapted to prevent the formation of a hard cake in the vicinity of the point of introduction of said materials.

11. An apparatus for the manufacture of hydrofluoris acid from a fluoride and an acid comprising a decomposition chamber, feeding means for continuously introducing a fluoride at a uniform rate into said chamber, an inlet for separately and continuously introducing an acid at a uniform rate into said chamber, and means for subjecting said materials within said chamber to continuous agitation sufficient to prevent the formation of a hard cake.

12. An apparatus for the manufacture of hydrofluoric acid from a fluoride and an acid comprising a decomposition chamber, means for introducing a fluoride into a directly heated portion of said chamber, means for simultaneously and separately introducing an acid into said heated portion of said chamber, and means for subjecting said materials within said chamber in the vicinity of the point of introduction thereof to continuous agitation sufficient to prevent the formation of a hard cake, and means for heating said chamber.

13. An apparatus for the manufacture of hydrofluoric acid from a fluoride and an acid comprising a decomposition chamber adapted to rotate upon a substantially horizontal axis, said chamber having one or more loose beams therein extending longitudinally of said chamber, feeding means for continuously introducing a fluoride into said chamber at a uniform rate, means for simultaneously and separately introducing an acid into said chamber at a uniform rate, and means for heating said chamber.

14. An apparatus for the manufacture of hydrofluoric acid from a fluoride and an acid comprising a tubular chamber having its longitudinal axis substantially horizontal, said chamber having one or more loose beams therein extending longitudinally of said chamber, said beams having a weight of at least 25 pounds per foot, means for rotating said chamber, feeding means for continuously introducing a fluoride into said chamber at a uniform rate, means for simultaneously and separately introducing an acid into said chamber at uniform rate, and means for heating said chamber.

15. An apparatus for the manufacture of hydrofluoric acid from a fluoride and an acid comprising a tubular chamber having its longitudinal axis substantially horizontal, said chamber having one or more loose beams therein extending longitudinally the complete length of said cylinder, said beams having a compact cross section and a weight of at least 25 lbs. per foot, means for rotating said chamber, a screw conveyor for continuously introducing a fluoride into said chamber, an acid inlet adapted to separately and continuously introduce acid into said chamber and means for heating said chamber.

16. An apparatus for the manufacture of hydrofluoric acid from a fluoride and an acid comprising a tubular chamber having its longitudinal axis substantially horizontal, said chamber having one or more rails therein extending longitudinally the complete length of the cylinder and having a weight of at least 25 lbs. per foot, means for rotating said chamber, a screw conveyor for continuously introducing a fluoride into a directly heated portion of said chamber, an inlet for simultaneously and separately introducing an acid directly and continuously into said heated portion of said chamber and means for heating said chamber.

In testimony whereof, I affix my signature.

GARNETT L. SCOTT.